United States Patent

[11] 3,603,478

[72] Inventor Andrew S. Connan
53 Roosevelt Ave., Glen Head, N.Y. 11545

[21] Appl. No. 25,193
[22] Filed Apr. 2, 1970
[45] Patented Sept. 7, 1971

[54] TAPE CASETTE HOLDER
5 Claims, 5 Drawing Figs.

[52] U.S. Cl. ........ 221/87
[51] Int. Cl. ........ G07f 11/00
[50] Field of Search ........ 221/87; 312/14, 15; 220/315

[56] References Cited

UNITED STATES PATENTS

| | | | |
|---|---|---|---|
| 1,106,848 | 8/1914 | Roovers | 221/87 |
| 3,240,375 | 3/1966 | Burrows | 220/315 X |
| 3,499,525 | 3/1970 | Kanter | 220/315 X |

*Primary Examiner*—Robert B. Reeves
*Assistant Examiner*—John P. Shannon, Jr.
*Attorney*—Charles E. Temko

ABSTRACT: An integrally molded case, the interior of which is subdivided into a plurality of compartments, each capable of accommodating a tape casette or similar article. Each compartment includes an integrally molded spring engaging one end of the casette, and a hinged lid includes a second resilient element engaging an opposite end of the casette when in closed position, whereby the casette is cushioned against movement along its longest axis, and frictionally retained against movement within the compartment along an axis perpendicular thereto. The resilient means on the lid elements include a projection which normally extends outwardly from the outer surface of the lid element when the lid has been closed upon a compartment containing a casette, thereby giving tactile indication to the user of the presence of the casette within the compartment.

PATENTED SEP 7 1971

3,603,478

SHEET 2 OF 2

TAPE CASETTE HOLDER

This invention relates generally to the field of tape casette holders, and more particularly to an improved form thereof which may be conveniently manufactured at relatively low cost, and which affords substantial advantages over prior art constructions.

Previous constructions have for the most part been constructed in the form of a conventional chipboard box having a lid covering the open ends of a plurality of compartments formed by providing a plurality of septums extending across the interior of the box. While such devices have been suitable for home use, they have proven inadequate for use by the driver of a vehicle, who very often cannot see the device while manipulating casettes, owing to the necessity of maintaining a steady gaze on the road ahead. Further, prior art devices have not provided means for resiliently cushioning the individual casettes when in position within the holder, and have incorporated no means for absorbing normal vibration occurring within the interior of a vehicle. Another disadvantage in prior art constructions has been the provision of a single lid which overlies all of the compartments within the box, so that when the lid is opened, the possibility of spillage of the cassettes disposed therein is always present.

It is therefore among the principal objects of the present invention to provide an improved tape casette holder of the class described, in which the above mentioned disadvantages have been substantially eliminated.

Another object of the invention lies in the provision of an improved tape casette holder in which each of the individual compartments capable of enclosing a single casette is provided with its own individually latchable lid so that at no time need more than one casette be exposed for withdrawal or replacement.

Another object of the invention lies in the provision of an improved tape casette holder, in which each individual compartment is provided with an integrally molded resilient means serving to simultaneously at least partially open the lid once the latch associated therewith has been released, and to partially eject the casette holder, so that the same may be conveniently grasped by a user.

A further object of the invention lies in the provision of an improved tape casettte holder of the class described which incorporates in association with each compartment indicating means which may be tactilely sensed by a user to evidence the presence of a casette disposed within the compartment.

Yet another object of the invention lies in the provision of an improved tape casette holder, in which the individual casettes are maintained within individual compartments under resilient compression, by means which at least partially serves as a vibration dampener.

Still another object of the invention lies in the provision of an improved tape casette holder of the class described, in which the cost of fabrication may be of a reasonably low order, directly comparable with existing prior art devices, thereby permitting consequent wide sale, distribution and use.

A feature of the disclosed embodiment lies in the fact that it may be conveniently molded in one piece from relatively low cost synthetic resinous materials, such as polypropylene, and similar materials.

These objects and feature, as well as other incidental ends and advantages, will more clearly appear in the progress of the following disclosure, and be pointed out in the appended claims.

In the drawings, to which reference will be made in the specification, similar reference characters have been employed to designate corresponding parts throughout the several views.

Figure 1:
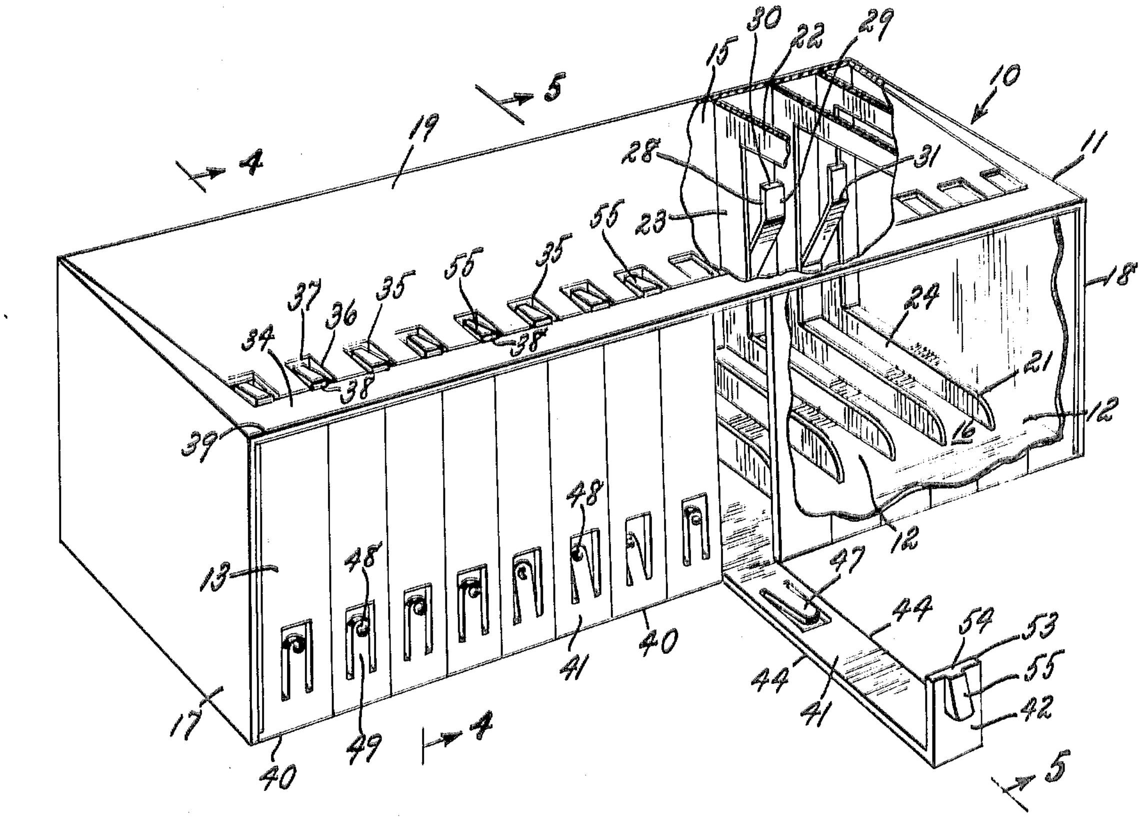
FIG. 1 is a view of perspective, partly broken away to show detail of an embodiment of the invention.
Figure 2:
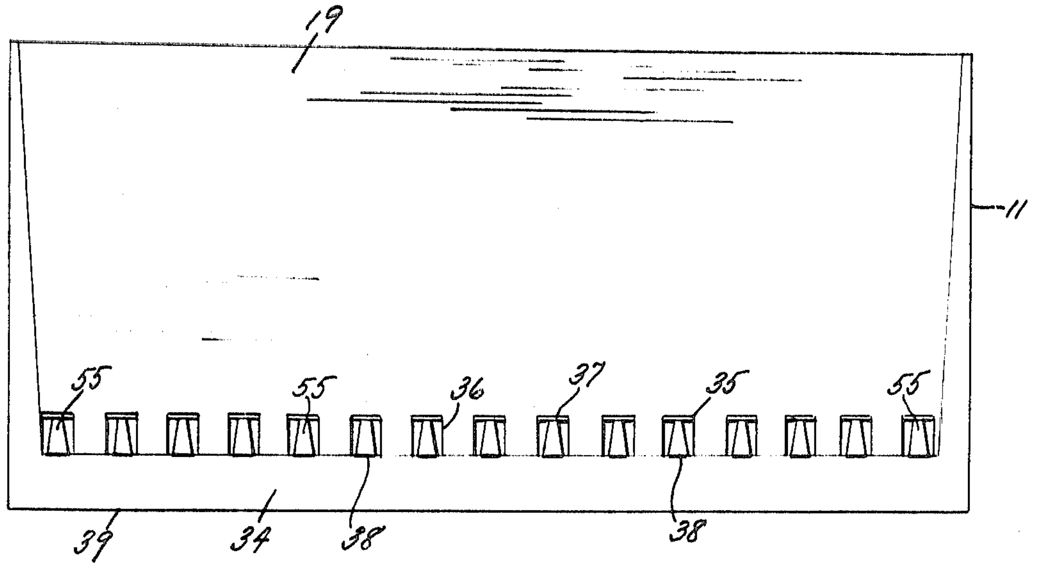
FIG. 2 is a top plan view thereof.
Figure 3:
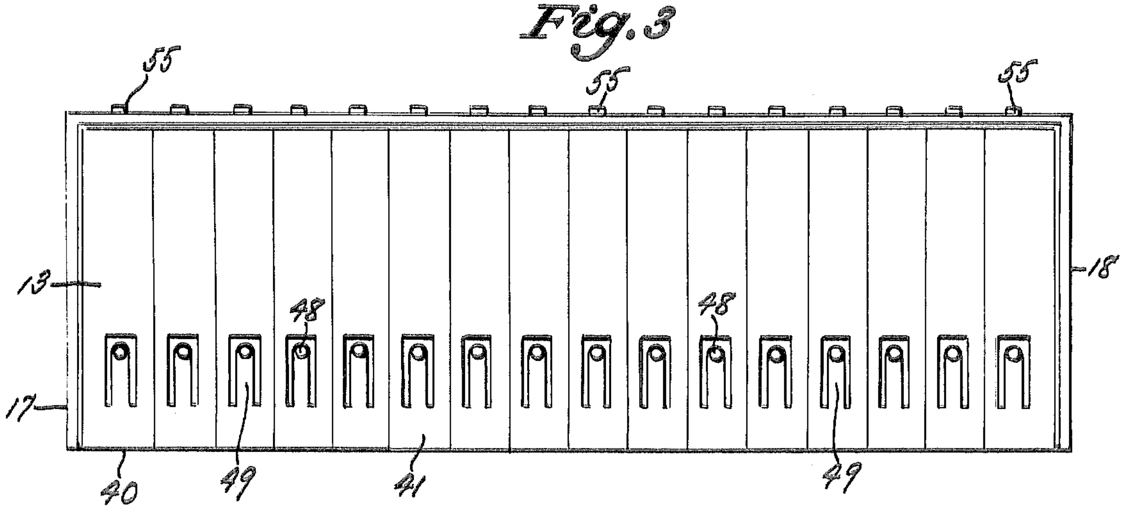
FIG. 3 is a front elevational view thereof.

In accordance with the invention, the device generally indicated by reference character 10, is preferably formed as a single integral molding of synthetic resinous material, such as polypropylene, polyethylene, and other synthetic resinous materials having similar properties. It includes a main body element 11, forming a plurality of compartments 12, and a plurality of individual lid elements 13 overlying said compartments 12.

Figure 4:
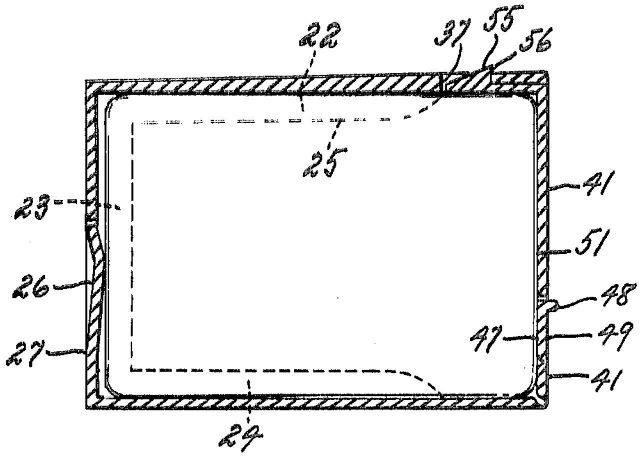
FIG. 4 is a transverse sectional view thereof as seen from the plane 4—4 in FIG. 2.

The main body element 11 includes a rear wall 15, a bottom wall 16, sidewalls 17 and 18, and a top wall 19. Extending inwardly from the inner surface 20 of the body element 11 are a plurality of guiding ribs 21, each including an upper side portion 22, a lower side portion 23, and a rear portion 24, as best seen in FIg. 4. A continuous curvilinear edge 25 extends from the bottom wall 16 to the top wall 19. The ribs each delineate a plurality of compartments, each accommodating a single casette.

Figure 5:
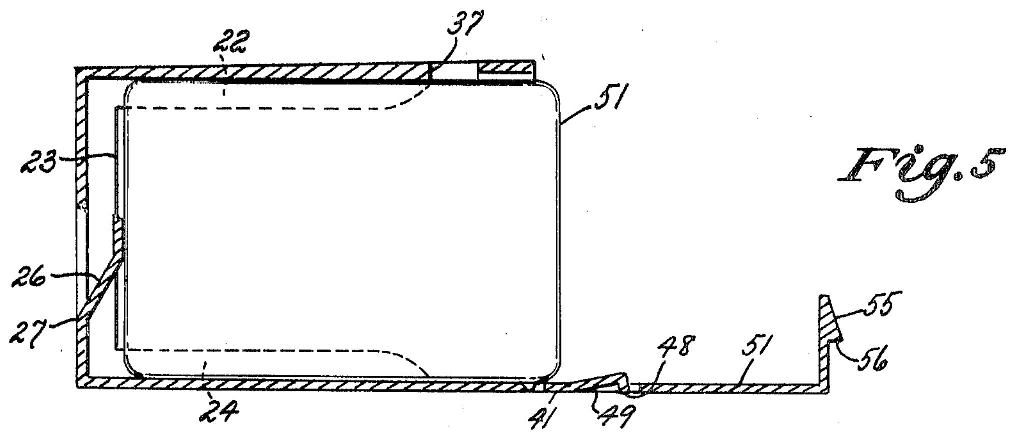
FIg. 5 is a second sectional view thereof showing certain of the component parts in altered relative position.

As best seen in FIGS. 1 and 5, the rear wall 15 includes a plurality of leaf springs 26 interconnected thereto by bend portions 27, and bounded by rectilinear edges 28 and 29 and an end edge 30. A second bend portion 31 permits the unstressed positioning of the end edge 30 such that it will not contact an inner edge surface of a casette as the same is inserted to cause possible jamming.

The top wall 19 includes a raised area 34 surrounding a plurality of finger engageable openings 35 of generally rectangular configuration. Each opening is bounded by side edges 36, a rear edge 37 which forms a stop for a closed lid element, and a forward edge 38. That portion of the raised area 34 disposed between the forward edges 38 and the free edge 39 forms a strike cooperating with a latching means on the individual lid elements 13.

The lid elements 13, as has been mentioned, are preferably integrally molded with the main body element 11, each including a hinged area 40, an elongated cover member 41 and a latch member 42 disposed substantially at right angles thereto.

Each cover member 41 is bounded by a pair of longitudinal edges 44, which juxtapose the edges of adjacent cover members, and an end edge 46. A resilient tongue 47 includes an outwardly extending projection 48 on an outer surface 49 thereof. In unstressed condition, the tongue 47 projects inwardly of the plane of the cover member to contact a cassette, generally indicated by reference character 51 disposed therebeneath.

The latch member 42 includes a laterally extending planar portion 53, an end surface 54 of which engages the rear edge 37 of the corresponding opening 35 when the lid elements are in closed condition. A tapered portion 55 forms a latch, the perpendicular end surface 56 engaging the forward edge 38, as best seen in FIG. 4.

During use in a vehicle, the device is most conveniently situated on a seat beside the driver, so as to be conveniently manipulatable by a single hand. The presence of a casette disposed within a compartment may be readily detected by merely running the fingers over the upper surface of a lid element until a projection is sensed. Next, the finger is inserted into the corresponding opening 35, at which time the latch member 42 is released, and the resilient force of the spring 26 urges the casette outwardly. This motion will also be transmitted to the tongue 47, resulting in the lid element moving to the opened position shown in FIg. 1. Continued movement of the casette will cause it to project slightly outwardly of the compartment, so as to be conveniently grasped between the thumb and forefinger of the user, to be positioned in an adjacent tape player. A discarded casette may be inserted in the same now empty compartment, or, where its predetermined location is known, it may be returned to such location. As the casette is inserted into the corresponding compartment, it may be manually pushed to compress the spring 26, and held in such condition while the lid element is returned to closed position.

It will be observed that owing to the presence of resilient force exerted on both ends of the individual casettes, a degree of dampening of vibration which may be transmitted from the vehicle while in motion is achieved. This action makes it unnecessary to provide conventional locking of the spool hubs during storage, as the tendency to unwind resulting from vibration is reduced to a minimal degree.

I wish it to be understood that I do not consider the invention limited to the precise details of structure shown and set forth in this specification, for obvious modifications will occur to those skilled in the art to which the invention pertains.

I claim:

1. A device for storing and selectively retrieving audio tape casettes comprising: a main body element forming a cavity, a plurality of interior ribs at least partially dividing said cavity to subdivided areas, each capable of accommodating a single casette, said main body element including a rear wall, the inner surface of which borders each of said subdivided areas; and a plurality of resilient means mounted upon said rear wall and extending into said subdivided areas, whereby upon the insertion of a casette into one of said subdivided areas, said resilient member will become stressed to urge said casette at least partially outwardly of said subdivided area.

2. Structure in accordance with claim 1, said main body element having a plurality of parallel lid elements, each hingedly connected to one edge of said main body element, and selectively positionable to overlie a subdivided area disposed in coplanar relation therewith.

3. Structure in accordance with claim 2, said lid elements each including resilient means normally extending into a subdivided area when said lid element is in closed position to contact a surface of a casette disposed therein.

4. Structure in accordance with claim 3, said resilient means on said lid elements including a projection on an outer surface thereof which will project outwardly of an outer surface of said lid element when said lid element is in closed position and said resilient means contacts a surface of a casette lying therebeneath, whereby the presence of said casette may be tactically sensed by a user.

5. Structure in accordance with claim 3, in which said lid elements include integrally molded latching means, said main body element including correspondingly positioned strike means thereon.